Aug. 13, 1968     L. J. WINDECKER     3,396,922

SPAR AND WING STRUCTURE THEREFROM

Filed Nov. 21, 1966

INVENTOR.
Leo J. Windecker

BY

*Robert W. Ingraham*

AGENT

United States Patent Office 3,396,922
Patented Aug. 13, 1968

3,396,922
SPAR AND WING STRUCTURE THEREFROM
Leo J. Windecker, Midland, Tex., assignor to The Dow Chemical Company, Midland, Mich., a corporation of Delaware
Filed Nov. 21, 1966, Ser. No. 595,932
18 Claims. (Cl. 244—123)

ABSTRACT OF THE DISCLOSURE

An airplane wing is disclosed having a foam plastic core, a continuous non-foamed skin and a number of spars within the wing, the spars being hollow tubes having a graduated layer of glass reinforced resin on the outer surfaces thereof which decreases in thickness toward the wing tip. Stubs secured in the tube provide for attachment of the wing to an aircraft body.

---

This invention relates to an improved spar and a wing structure prepared therefrom and more particularly relates to an improved tapered spar and a plastic foam filled aircraft wing prepared therewith.

In my previous application Ser. No. 438,143, filed Jan. 21, 1965, for "Improved Airfoil Structure," now United States Letters Patent 3,273,833, an improved wing structure was disclosed utilizing an improved aircraft wing structure employing a foam plastic core adhered to a continuous skin and utilizing tubular spars positioned within the foam core. It is particularly desirable in aircraft construction or other construction wherein cantilevered beams or spars are employed that such a beam or spar have greater strength adjacent the end which is cantilevered. Employing a tapering configuration maximum strength to weight ratio is then obtained. In the fabrication of light-weight, high-strength elements such as aircraft wings disclosed in my prior application it would be desirable if there were available a convenient tapered aircraft wing spar and a wing incorporating such spars.

It would be desirable if such spars were relatively easily fabricated and exhibited relatively high strength per unit weight.

Furthermore, it would be desirable if such spars could be fabricated with minimal equipment and time.

These benefits and other advantages in accordance with the present invention are achieved in a wing spar, the wing spar comprising an elongate hollow tube of generally constant cross section, the tube having an internal surface and an external surface, the tube having a first end and a second end, a filamentary reinforcing material embedded in a synthetic resinous matrix, the synthetic resinous matrix being adhered to the external surface of the tube and the filamentary reinforcing decreasing in quantity toward the second end of the tube.

Also contemplated within the scope of the invention is an aircraft wing comprising a rigid synthetic resinous foamed core, the foamed core having a plurality of the hereinbefore described spars embedded within the core, the wing having a root section and a tip section. Each of the spars has a major portion of the reinforcing disposed at the root section of the wing and a continuous non-foamed skin disposed over the foamed resinous core.

Further features and advantages of the present invention will become more apparent from the following specification taken in connection with the drawing wherein.

Figure 1:
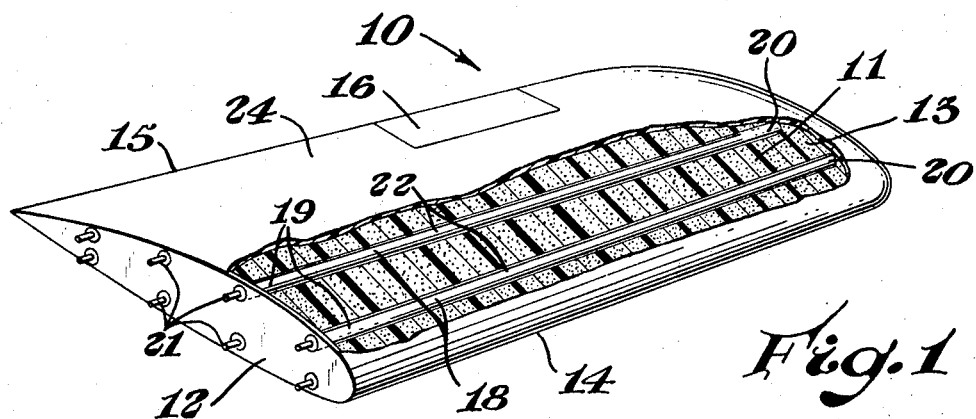
FIGURE 1 is a schematic partially cut-away view of an aircraft wing in accordance with the invention.

In FIGURE 1 there is depicted a schematic cut-away view of an aircraft wing in accordance with the present invention generally designated by the reference numeral 10. The wing 10 comprises an elongate airfoil shape rigid foam plastic core 11. The core 11 has a root end 12 and a tip end 13. The wing 10 has a leading edge 14 and a trailing edge 15. A control element 16 is movably mounted adjacent the trailing edge 15. The core 11 has embedded therein a plurality of wing spars 18, the wing spars have a first or root end 19 and a second or tip end 20. The spars 18 have a generally hollow tubular configuration. Each of the spars 18 has at its root end 19 a mounting plug or stub shaft 21. The spars 18 have a filamentary reinforcing coating 22 disposed adjacent to the external surface thereof. The coating 22 comprises a filamentary reinforcing material embedded in the synthetic resinous matrix, the quantity of resin and reinforcing material decreasing as the distance from the root end 19 toward the tip end 20 increases. The spars 18 are disposed generally parallel and in closely adjacent spaced relationship to the core 11 and are embedded within the core. A generally continuous non-foamed skin 24 is adhered to the surface of the core 11.

Figure 2:
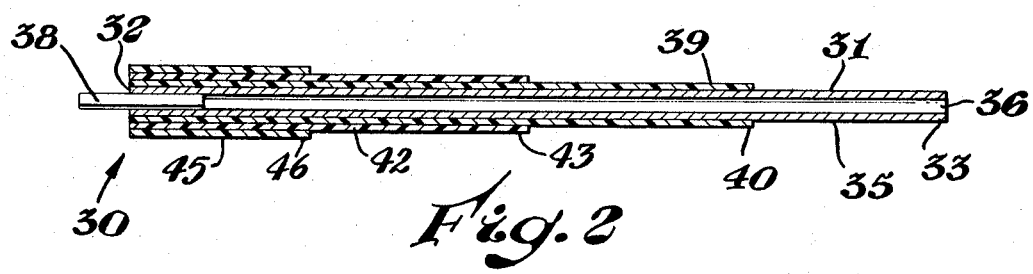
FIGURE 2 is a sectional view of a spar in accordance with the invention.

In FIGURE 2 there is depicted a sectional view of a spar in accordance with the invention generally designated by the reference numeral 30. The spar 30 comprises a hollow cylindrical tube 31. The tube 31 has a first or root end 32 and a second or tip end 33. The tube 31 has an external cylindrical surface 35 and an internal cylindrical passageway or cavity 36. Beneficially the tube 31 is formed of a light high strength material such as hard aluminum, cold rolled steel, magnesium, titanium or the like. A connecting insert 38 of generally cylindrical configuration is partially disposed within the passageway 36 adjacent the root end 32 and is adapted to be received and supported by wing root or other similar support. A first layer 39 of filamentary reinforcing material is disposed externally about a major portion of the external surface 35 of the tube 31. The layer 39 extends from the root end 32 to a location 40 lying between the first end 32 and the second end 33. The layer 39 comprises a filamentary reinforcing material such as glass fiber disposed in the hardened synthetic resinous matrix, the matrix serving to adhere to the filamentary reinforcing material and to the external surface 35 of the tubular member 31. A second layer of filamentary reinforcing material 42 is disposed about a portion of the layer 39, the reinforcing layer 42 beneficially is of similar composition to the layer 39. The layer 42 extends from the first or root end 32 to a position or location 43 lying between the location 40 and the first end 32. A third layer 45 of filamentary reinforcing material is disposed about the second layer 42. The layer 45 is of similar composition to the layers 42 and 39. The layer 45 terminates at a location 46 lying between the location 43 and the first end 32. A spar such as the spar 30 of FIGURE 2 is readily fabricated by employing a tubular support member and applying a layer of filamentary reinforcing material such as the layer 39 which beneficially may be the glass cloth impregnated with rigid epoxy resin. Beneficially the glass cloth is selected in such a manner that its direction of maximum tensile strength is generally parallel to the longitudinal axis of the tube 31. The layer 39 is applied and in a similar manner the layers 42 and 45 are subsequently applied. Advantageously when employing materials such as epoxy resin it is not necessary to permit the first layer to cure before adding the second layer, thus by employing conventional wet lay-up techniques the entire spar is formed and cured at room temperature or elevated temperatures as desired. A stub or support means 38 may be incorporated within the tube 31 at any desired stage during the manufacture of the spar. Beneficially such a plug oftentimes is incorporated within the tubing 31 prior to the application of the filamentary reinforcing as the stub 38 provides a means of support. Beneficially when employing a metallic tube it is often desirable to prime the external surface 35 of the tube 31 by supporting the stub 38 in a rotating means such as a lathe, rotating the tube about its axis and wet sanding the surface of the spar employing epoxy resin on an abrasive cloth or epoxy resin abrasive on a suitable pad such as felt, waste or the like. The resultant spars may be incorporated into the wing structure of FIGURE 1 in the manner described in my prior U.S. Patent No. 3,273,833. Such a reinforced spar may be installed in the wing in either the cured or uncured condition.

It is oftentimes desirable where large quantities of resin and filamentary reinforcing resin have been added to the tubular member to cure the spar prior to insertion in the wing structure in order to avoid overly rapid polymerization of the resinous material. However, proper selection of the catalyst quantities will usually provide an adequate rate of cure without thermal run-away or decomposition.

Figure 3:
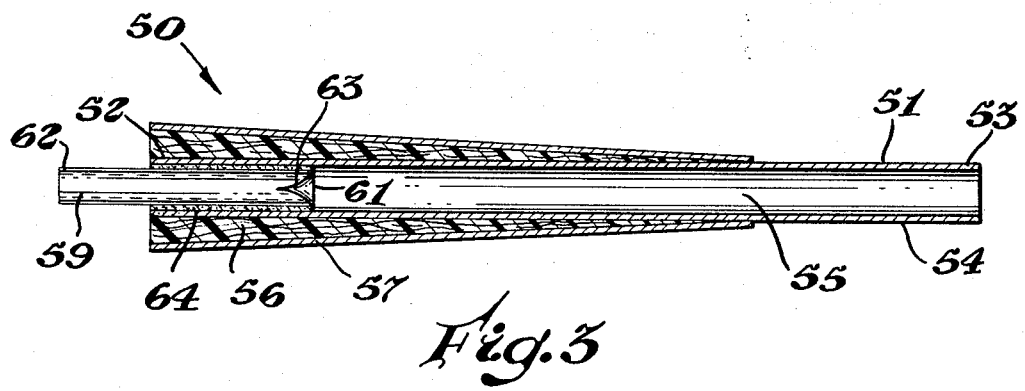
FIGURES 3 and 4 are alternate views of spars in accordance with the present invention.

In FIGURE 3 there is depicted an alternate embodiment of the spar in accordance with the invention generally designated by the reference numeral 50. The spar 50 comprises a cylindrical tube or body 51 having a first or root end 52 and a second or tip end 53. The tubular body has an external surface and an internal cylindrical cavity 55. An external coating 56 of glass roving and synthetic resin is disposed on the surface 54. The coating 56 comprises a plurality of strands of filamentary reinforcing such as glass filaments of varying lengths, the lengths being selectively trimmed so that the coating has a maximum thickness adjacent the root end 52 and tapers toward the tip end 53. The coating 56 is optionally overwrapped with a thin layer 57 of a cloth impregnated with a curable resin such as an epoxy resin. Disposed within the cylindrical cavity 55 is a mounting stub 59. The stub 59 is partially disposed within the cylindrical passageway 55. The stub 59 is a hollow tubular member having a spar end 61 and a mounting end 62. The spar end 61 defines a deep curving slot 63. The stub 59 is adhered to the tubular member 51 by a layer 64 of curable synthetic resin and filamentary reinforcing material. Beneficially the curving slot 61 reduces stress concentration when the spar is cantilevered from the stub 59.

Figure 4:
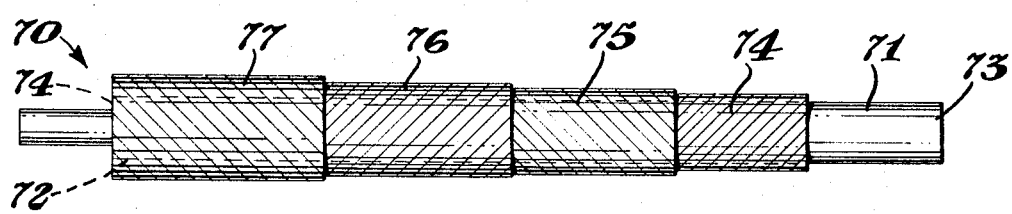

In FIGURE 4 there is depicted an alternate embodiment of a spar in accordance with the present invention generally designated by the reference numeral 70. The spar 70 comprises a cylindrical support and body 71 having a root or first end 72 and a second or tip end 73. The first layer 74 is disposed over a major portion of the spar. The first layer 74 comprises a filamentary reinforcing material in a synthetic resinous matrix wound in a helical manner which may be arbitrarily defined as left handed. The layer 74 extends to a first end 72, a shorter layer 75 of the filamentary reinforcing material and synthetic resin is wound over the layer 74 and the layer 75 begins at the first end 72 and extends for a distance substantially less than the layer 74. The layer 75 is wound in the opposite hand to that of the layer 74. Successively shorter layers of filamentary reinforcing 76 and 77 which are wound with an opposite hand to that of adjacent layers are disposed over layers 74 and 75.

The spar of FIGURE 2 is particularly advantageous in that it is readily prepared with a minimum difficulty previously employing a reinforcing fabric which exhibits high strength in one direction, for example, in the warp direction. In such a case the warp of the fabric is disposed parallel to the longitudinal axis of the conduit 31. No special equipment is required for the embodiment of FIGURE 2.

The embodiment of FIGURE 3 is particularly advantageous in that the maximum strength per unit weight is obtained by applying roving generally uniformly about the spar cutting the roving in such a manner that the bundle tapers towards the tip end of the spar and subsequently saturates the filaments with a suitable hardening resin and beneficially squeezing out excess resin and optionally overwrapping with a light reinforcing fabric saturated with resin. The fabrication of the embodiment of FIGURE 3 requires considerably more care and labor than does that of the embodiment of FIGURE 2.

The embodiment of FIGURE 4 is a convenient compromise which may be readily fabricated employing a lathe and winding fabric or roving in layers of alternating helical hand to provide a high strength spar.

Beneficially the spars in accordance with FIGURE 2, 3 or 4 are readily incorporated in foam plastic wing cores and fabricated into wings in accordance with my U.S. Patent No. 3,273,833.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:
1. A wing spar, the wing spar comprising an elongate tubular body of generally constant cross section, the body being an elongate hollow tube of constant cross section, the tube having an internal surface and an external surface, the tube having a first end and a second end, a filamentary reinforcing material embedded in a synthetic matrix, the synthetic matrix being adhered to the external surface of the tube, the filamentary reinforcing decreasing in quantity toward the second end of the tube and a mounting stub disposed within the first end of the tube.

2. The spar of claim 1 wherein the filamentary reinforcing material is glass.

3. The spar of claim 2 wherein the synthetic resinous matrix is an epoxy resin.

4. The spar of claim 2 wherein the filamentary reinforcing material comprises a plurality of layers of a woven fabric.

5. The spar of claim 4 wherein the fabric is disposed on the spar in a plurality of generally concentric layers having the warp helically disposed and of opposite hand in adjacent layers.

6. The spar of claim 1 wherein the stub is adhered to the tube by means of a curable resin and filamentary reinforcing material.

7. The spar of claim 6 wherein the filamentary reinforcing material is glass filaments and the curable resin securing the stub to the spar is an epoxy resin.

8. The spar of claim 2 wherein a major portion of the filamentary glass is disposed generally parallel to the longitudinal axis of the tube.

9. The spar of claim 8 wherein the filamentary reinforcing is glass roving.

10. An aircraft wing comprising a rigid synthetic resinous foamed core, the foamed core having a plurality of spars embedded therein, the wing having a root section and a tip section, a continuous non-foamed skin disposed over the foamed resinous core, each of the spars being disposed generally adjacent the non-foamed skin, the spars having a first and a second end, and comprising a hollow tube of generally constant cross section, the tube having an internal surface and an external surface, the tube having a first or root end and a second or tip end, the first or root end of the spars and the second or tip end being disposed adjacent the root section and the tip section of the wing, respectively, a filamentary reinforcing material embedded in a synthetic resinous matrix, the synthetic resinous matrix being adhered to the external surface of the tube, the filamentary reinforcing decreasing in quantity toward the second end of the tube and a mounting stub being disposed within the first end of each tube.

11. The wing of claim 10 wherein the filamentary reinforcing material is glass.

12. The wing of claim 11 wherein the synthetic resinous matrix is an epoxy resin.

13. The wing of claim 11 wherein the filamentary reinforcing material comprises a plurality of layers of a woven fabric.

14. The wing of claim 13 wherein the fabric is disposed on the tube in a plurality of generally concentric layers having the warp helically disposed and of opposite hand in adjacent layers.

15. The wing of claim 10 wherein each stub is adhered to the tube by means of a curable resin and filamentary reinforcing material.

16. The wing of claim 15 wherein the filamentary reinforcing material is glass filaments and the curable resin securing the stub to the wing is an epoxy resin.

17. The wing of claim 11 wherein a major portion of the filamentary glass is disposed generally parallel to the longitudinal axis of the tube.

18. The wing of claim 17 wherein the filamentary reinforcing is glass roving.

References Cited
UNITED STATES PATENTS

| | | | |
|---|---|---|---|
| 2,136,265 | 10/1938 | Petty | 244—123 |
| 2,749,061 | 6/1956 | Franz | 244—123 |
| 2,847,786 | 8/1958 | Hartley et al. | 42—76 |
| 3,273,833 | 9/1966 | Windecker | 244—123 |

MILTON BUCHLER, *Primary Examiner.*

J. PITTENGER, *Assistant Examiner.*